Aug. 23, 1927.

C. B. STRANDGREN 1,639,908

TURBINE WHEEL PROPELLER AND MOTOR

Filed Oct. 17, 1925  5 Sheets-Sheet 1

C. B. Strandgren
INVENTOR
By: Marks & Clerk
Attys

Fig. 2

Patented Aug. 23, 1927.

1,639,908

UNITED STATES PATENT OFFICE.

CARL BRUNO STRANDGREN, OF PARIS, FRANCE.

TURBINE-WHEEL PROPELLER AND MOTOR.

Application filed October 17, 1925, Serial No. 63,013, and in Great Britain August 25, 1925.

My invention has for its object a turbine wheel which serves either as a propeller for a vehicle moving in a fluid, or as a motor which is actuated by a fluid in motion.

The wheel according to the invention is characterized in that it comprises a plurality of wings, paddles or the like, disposed about a central shaft which is perpendicular to the direction of its motion relatively to the fluid, and around which the said wings or like elements are rotatable, the latter being also adapted to swing upon axes parallel with the said central shaft while rotating about the latter.

Another feature of the invention consists in the means for controlling the oscillating movement of the said wings whereby the law of this movement may be varied. The oscillation of the said wings is so regulated that the latter shall form at each instant a determined angle with the tangent to their relative trajectory in the fluid, or otherwise stated, the oscillating motion is such that the normals to the wing surfaces will constantly intersect at a single point.

It will be noted that in the case of a propeller, such a motion of the wings relatively to the air constitutes a sliding or sailing flight in a circular path. If the aircraft or the actuating fluid is moved according to a straight path, i. e. if the central shaft has a translating motion relatively to the fluid, the path of the wings, which is the combination of this translation with the rotation of the wings about the shaft, is a cycloid whose rolling circle will have a greater or less diameter according to the value of the speed of rotation of the wheel and to the value of the speed of translation of the shaft relatively to the fluid.

I may obtain this result by controlling the oscillation of the wings for example by means of a cam member eccentrically mounted relatively to the central shaft together with suitable mechanical connecting means, cooperating with said cam member and pivoted to said wings. By varying the eccentricity of said cam member the angle of inclination of the wings is varied, and hence the angle formed at each instant between a given wing and the tangent to the relative path. The angle thus formed between each wing and the corresponding tangent is such that when the wheel is utilized as a propeller, the resulting action of the wings upon the fluid will have a component which causes the motion of the aircraft, whilst the resulting action of the fluid upon the wings, when the wheel is employed as a motor, is a torque which causes the rotation of the wheel.

It is a known fact that the practical speed of an aeroplane is chiefly limited by the necessity of providing large lifting surfaces in order that the aeroplane may rise from the ground at low speeds and that jarring motion due to rough ground shall not cause breakage of the parts.

My said apparatus, in its application as a propeller will obviate this drawback and will provide for the vertical ascent from the ground and without any wheel-travel of the aircraft.

Further characteristics of the invention will be set forth in the following description with reference to the appended drawing which diagrammatically illustrates the principle of the invention, and shows, by way of example, two embodiments of my said apparatus used as an aerial propeller.

In the appended drawing:

Fig. 3$^a$ a section view on the line 3$^a$—3$^a$ of Fig. 3.

In Figs. 1 to 6, which illustrate a constructional form of the said wheel as applied to aircraft, 1 is the main body, 2 a support having a cross section similar to that of an aeroplane wing and mounted on said body. Said support carries at its upper part a double-cone shaped body 3 through which extends a shaft 4 which is rotatable in ball-bearings 5.

Two similar wheels A, each comprising a star shaped member composed of a number of arms 6 are secured to the shaft 4. Said arms 6 are secured to a disc 8 which is keyed on the shaft 4 by means of a key 9. Said arms are made of sheet metal and have an aeroplane wing cross section (Fig. 3ª). The end of said arms overlap said disc and are secured thereto, for example by soldering. Their forward edge is tangent to the edge of said disc in order that the axis of said arms coincide with the direction of the stresses to which said arms are subjected.

To the shaft 4 are also secured two star shaped members having radial arms 6ª, and similar to the members 6.

The ends of the wings 7 are inserted in transverse plates 10, suitably cut out. Upon each plate 10, below the wing, are symmetrically disposed and secured two plates 11 and 12, for example by soldering. Between said plates is secured, by means of angle irons 19, a covering plate 18, suitably curved. The plates 11 and 12 are respectively provided with two holes 20 and 20ª and reinforcing ring 13 thereabout.

At the flattened end of each arm 6 is mounted a roller bearing comprising an outer ring 15 and an inner ring 14, with rollers 16 therebetween.

The ring 14 is inserted into the holes 20 and lateral shoulders 14ª insure the desired width between the plates 11 and 12. Between the plates 11 and 12 is pivoted at 20ª a link 17 extending radially along the corresponding arm 6 of the star-shaped member and is connected to the latter by a small lever 21 which is pivoted to the arm 6 at 22 and to the link 17 at 23. The pivoted connection between the link 17 and the corresponding wing embodies a similar device as described for the connection between the arm 6 and the wing. At the flattened end of each link 17 is mounted a roller bearing comprising an inner ring 25, an outer ring 26 and rollers 27 therebetween. The ring 25 is inserted into the holes 20ª and lateral shoulders are provided for maintaining the desired width between the plates 11 and 12.

At the end of the link 17 is formed a strap 28 traversed by two axles 29 upon which are rotatably mounted two rollers 30.

Reinforcing rings 31 are secured in a suitable manner, for example by soldering on the outer faces of the strap 28 and about the holes 20ª.

The rollers 30 cooperate with slots 32 provided in a ring 33, rotatably mounted on a disc 34, a ball bearing 35 being interposed between said disc and said ring. The disc 34 is provided with a rectangular opening 36 through which extends the shaft 4. The two vertical edges of said opening are indicated at 37 and 38 and the two horizontal edges are folded outwardly as indicated at 39 and 40.

A circular plate 41, secured to the body 3, is provided with four vertical slots 42, 43, 44, 45, with which cooperate four studs 42ª, 43ª, 44ª, 45ª respectively. The studs 42ª and 43ª are secured to an iron strip 46 and the studs 44ª and 45ª to an iron strip 47. Said strips respectively engage the folded edges 39 and 40 of the opening 36, which constitute a pair of parallel slides. The four studs are secured at their opposite end to a moving frame embodying two vertical bars 48 and 49, and two horizontal bars 50 and 51, all said bars being secured together and rigidly connected by a ring 52.

A double actuating spindle comprises an outer tubular spindle 53 and an inner spindle 54, respectively adapted to control the vertical displacements of said frame and the horizontal displacements of the disc 34. For this purpose, the tubular spindle 53 carries an arm 55 operatively connected by a link 56 to a crank lever 57, pivoted on the circular plate 41 at 59. The other end of the crank lever 57 is connected to an arm 58, pivoted at 60 on said moving frame.

The inner spindle 54 extends through a reinforced part 61 of the circular plate 41. A lever 62, secured to the spindle 54, is connected to an arm 63, pivoted at 64 on the disc 34.

The actuating device for the rotation of the spindles 53 and 54 and the symmetrically arranged spindles 53ª and 54ª comprises four quadrants 68, 65, 68ª, 65ª respectively secured to the end of each spindle 53, 54, 53ª, 54ª, at the middle of the body 3. Said quadrants are provided with helical toothings respectively meshing with worms 66, 69, 66ª, 69ª provided at the ends of vertically extending shafts 70, 67, 70ª, 67ª.

Figures 7, 8:
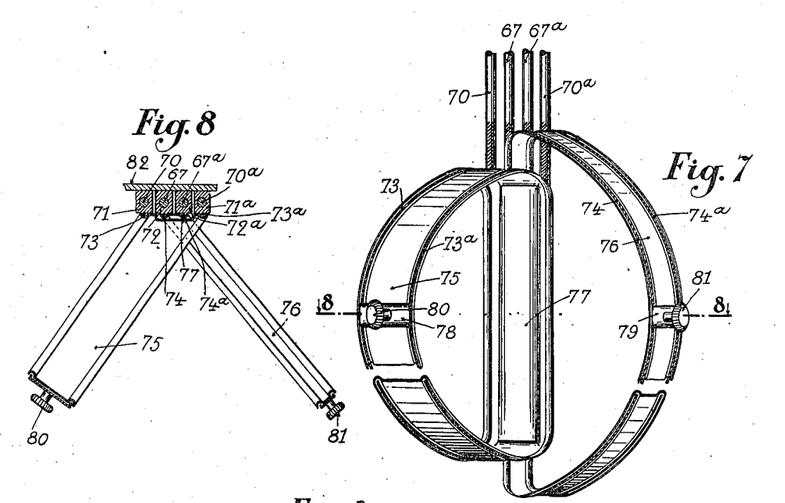
Fig. 7 is an elevation view of the wing controlling device.
Fig. 8 is a section view on the line 8—8 of Fig. 7.

Within the main body (Figs. 7 and 8) the lower ends of said shafts are threaded, the angle of inclination being greater than 45 degrees. Said threaded ends cooperate with nuts 71, 72, 71ª, 72ª connected, for example by soldering, to cables or wires 73, 74, 73ª, 74ª respectively. The nuts 71, 72, 71ª, 72ª are held by a plate 82 so as to prevent their rotation. The cables or wires 73 and 73ª are movable in grooves provided on a sheet iron member 75, having a substantially semi-cylindrical shape and are connected together by a small bar 78 having an actuating knob 80.

The piece 75 has a stamped recess 77, a sheet iron piece 76 similar to the piece 75 being disposed within said recess. The cables or wires 74 and 74ᵃ are movably arranged within grooves of the piece 76 and are connected together by a small bar 79, having an actuating knob 81.

The rotation of a motor 82, carried by brackets 83 of the main body 1, is transmitted by a vertical shaft 84 having secured thereto a bevel pinion 85 meshing with a bevel wheel 86 keyed on the shaft 4.

The operation is the following:

With the engine running, the shaft 84 drives the shaft 4 through the medium of the bevel gear 85, 86. The star-shaped members 6 and 6ᵃ are rotated together with the wings 7, the links 17, the rollers 30, the guides 32 and the ring 33 which rolls upon the disk 34. This latter is held against rotation by the engagement of the slides 39 and 40 with the strips 47 and 48, secured to the studs 42ᵃ, 43ᵃ, 44ᵃ, 45ᵃ cooperating with the slots 42, 43, 44, 45 of the circular fixed plate 41.

Figures 3, 6:
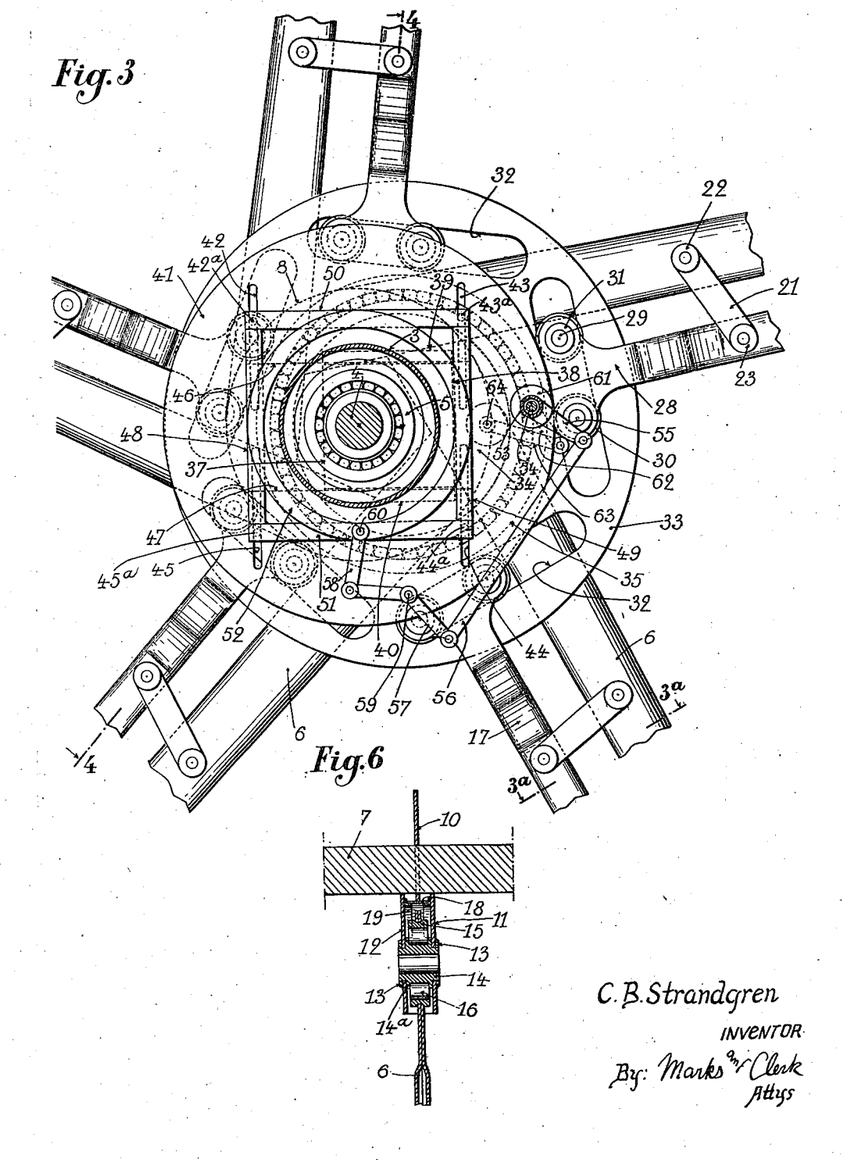
Fig. 3 is a partial section, on a larger scale, on the line 3—3 of Fig. 1.
Fig. 6 is a section view on the line 6—6 of Fig. 5.
Figure 3A:
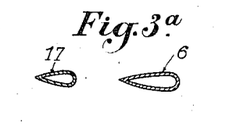
Figure 4:
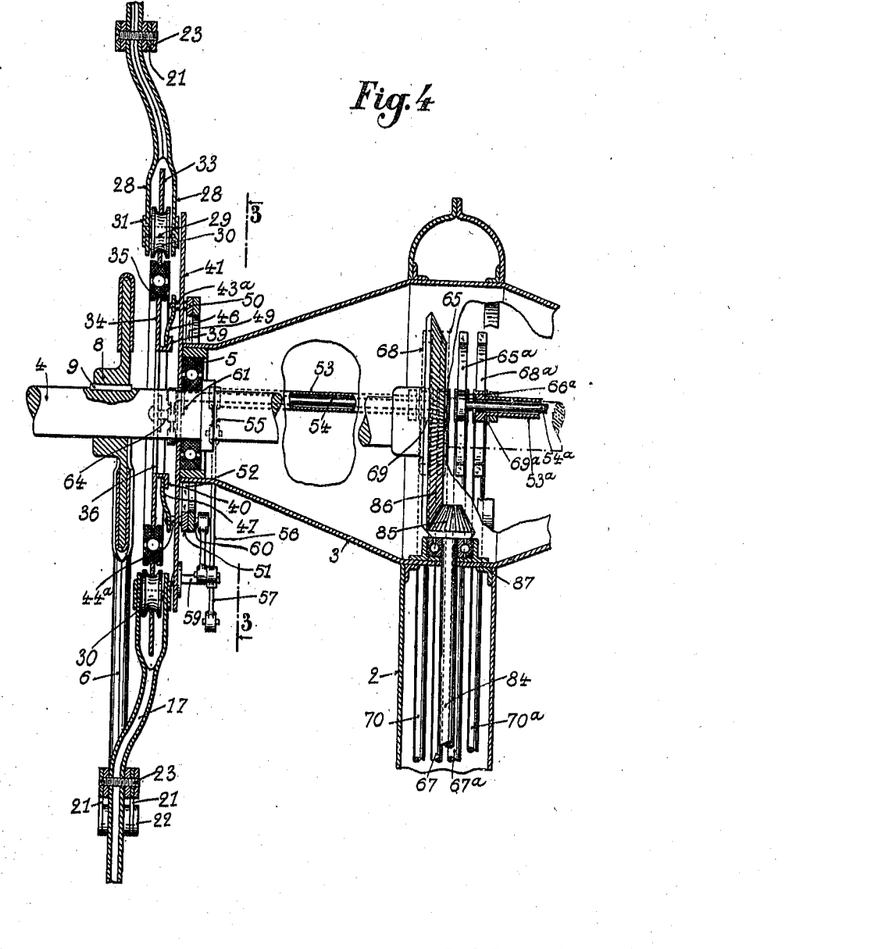
Fig. 4 is a partial sectional view partly broken away on the line 4—4 of Fig. 3.
Figure 5:
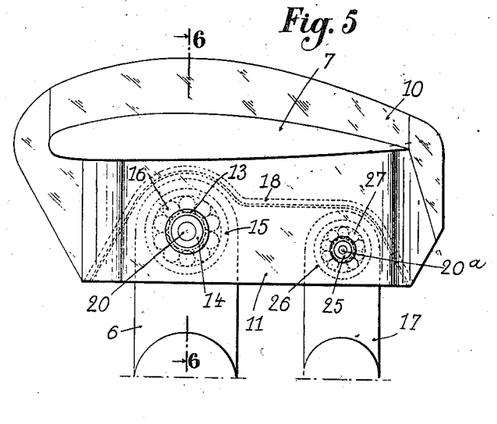
Fig. 5 is an elevational view on a larger scale showing the connection of a wing with the adjacent parts.

During the rotation of the ring 33, about the disc 34, which is shown in an accentered position in Fig. 3, the rollers 30, rolling in the guides 32 will move radially successively towards and from the shaft 4. The links 17 will be radially displaced, and will cause the wings 7 to pivot about their pivoting axis 20.

In order to vary the eccentricity of the disc 34, the knobs 80 and 81 will be actuated by the pilot who sits in front of the pieces 75 and 76.

Assuming that the knob 80 is moved so as to displace the small bar 78 according to a translation and upwardly, the cables or wires 73 and 73ᵃ will move in their grooves and will cause the nuts 71 and 71ᵃ to move downwards. The threaded shafts 70 and 70ᵃ will rotate counter-clockwise and will cause the toothed quadrants 68 and 68ᵃ to pivot downwards. The tubular spindle will rotate and the arm 55 will swing downwards. The crank arm will pivot and the arm 58 will raise the frame, the studs 42ᵃ, 43ᵃ, 44ᵃ, 45ᵃ, the strips 46 and 47 and the disc 34.

This will increase the vertical eccentricity of said disc and, at the same time, the eccentricity of the disc 34 belonging to the right hand wheel A.

Assuming now that the knob 80 is actuated so as to displace the small bar 79 according to a translation upwardly. This movement will be transmitted in a similar manner to the spindles 54 and 54ᵃ, through the medium of the cables 74, 74ᵃ, the nuts 72, 72ᵃ, the shafts 66, 66ᵃ and the quadrants 65, 65ᵃ.

The lever 62 secured to the spindle 54 will be lowered and the pivoting axle 64 will be moved to the left (position of Fig. 3). The disc 34 is thus pulled to the left, its slides 39 and 40 sliding on the strips 46 and 47. At the same time, the disc 34 of the right hand wheel A is eccentered to the left.

Instead of displacing the bars 78 and 79 according to a translation the knob 80, for instance, may be held in place but rotated about its axis. This will cause a slight relative displacement of the cables 73 and 73ᵃ and therefore, a different eccentricity of the disc 34 of the right hand wheel A relatively to the disc 34 of the left hand wheel A. The consequence is a slight difference in the law of movement of the oscillating wings at the left and at the right, thus permitting to turn or veer due to the difference of the air reactions on the two sets of wings.

Figures 1, 9, 10:
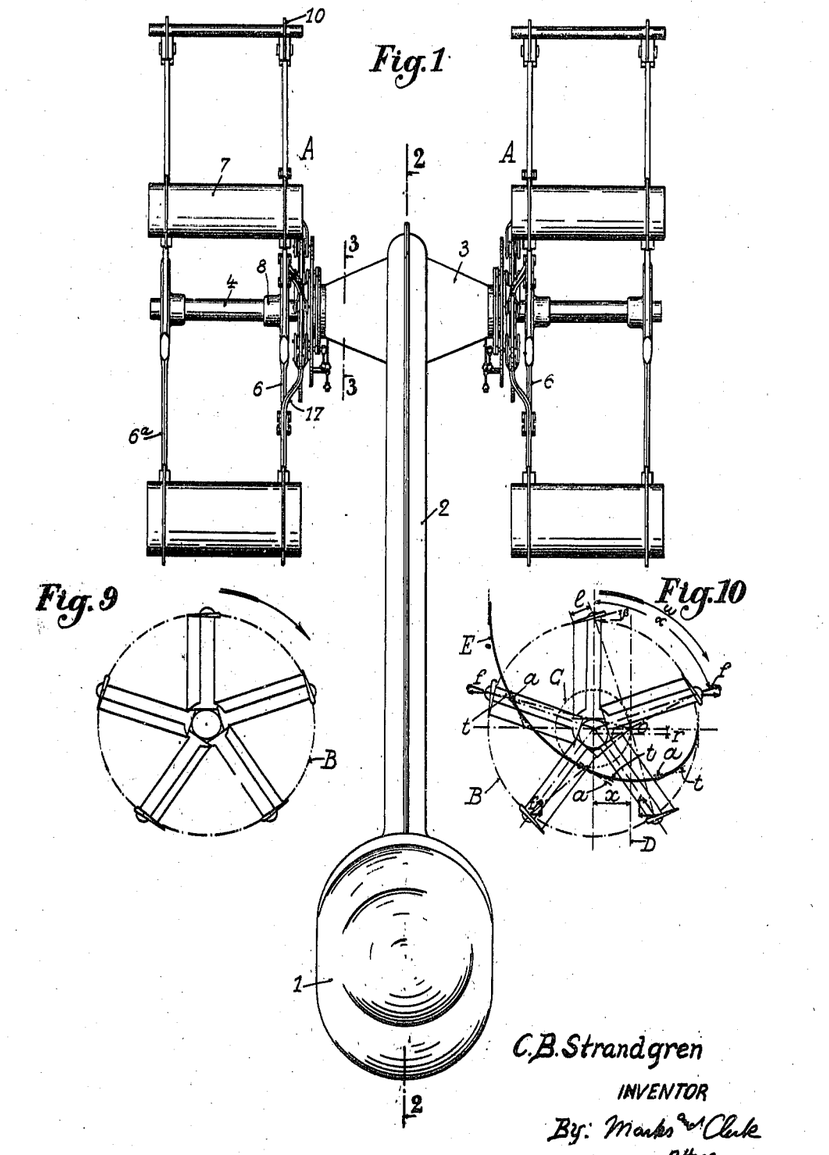
Fig. 1 is a diagrammatic elevational view of an aircraft provided with a propeller according to the invention.
Fig. 9 is a diagrammatic elevational view of the wheel, the control device for the oscillation of the wings being shown in the stationary position of the wings.
Fig. 10 is a view similar to Fig. 9, the control for the oscillation of the wings having the position which corresponds to the vertical motion of the propeller.
Figure 2:
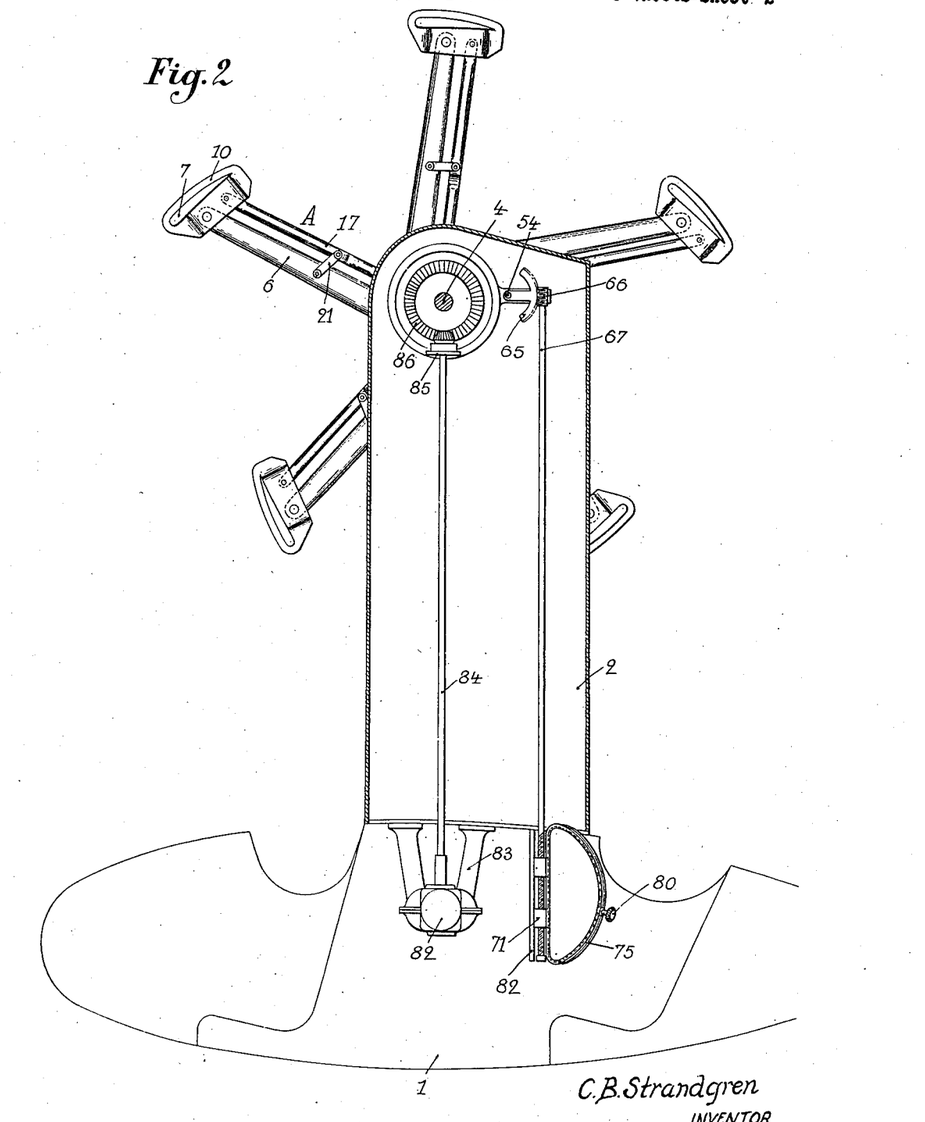
Fig. 2 is a diagrammatic section view on the line 2—2 of Fig. 1.

Fig. 9 shows the wheel when said eccentered disc 34 is in the position in which the axis of the shaft 4 passes through the centre of the ring 33. If the shaft 4 is rotated, the wings will remain tangent to the circle B which they describe, and the reactions of the air thereon will be mutually annulled. This will be the case when the aeroplane is on the ground while the engine is running. The eccentricity is then gradually increased in order that the wings begin to oscillate (Fig. 10).

For rising the aircraft from the ground, the bar 78 will be moved according to a translation so as to produce a vertical eccentricity of the disc 34.

It is found by calculation that the horizontal components of the air reactions on the wings will be mutually annulled, whilst the vertical components will be added together. When the resulting ascensional force is sufficient, the aircraft will rise vertically from the ground. When at the proper height, the bar 79 will be displaced according to a translation and the bar 78 is moved back to its idler position, so as to provide for a horizontal eccentricity.

If $\alpha$ is the angle between an arm of the star-shaped member and the line of the centres (Fig. 10) $l$ the length of the lever arm on the wing and $r$ the eccentricity, the angle $\beta$ between a wing and the tangent to the relative movement of rotation will be given by the formula $$\sin \beta = \frac{r}{l} \cos \alpha.$$

Figure 11:
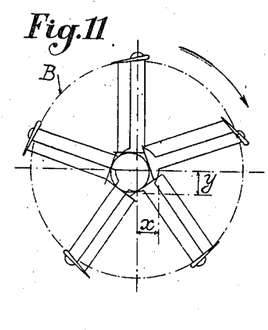
Fig. 11 is a view similar to Fig. 5, the control for the oscillation of the wings having the position corresponding to the horizontal motion of the propeller.

It will be observed in Fig. 10 that if the normal lines to the wings are drawn, they will all intersect at a point situated on the horizontal axis passing through the centre of the shaft and at a certain distance X therefrom. This point O is the instantaneous centre of rotation of the wings, and its position with reference to the centre of the shaft will be substantially constant for an entire cycle; it represents the point of contact between the rolling circle C and the rolling straight line D of the cycloid E described by the wings, said line being vertical in the case of Fig. 10 and horizontal in the case of Fig. 11.

Fig. 10 shows a certain number of instantaneous positions $a$ of a given wing and the corresponding tangents $t$ to the cycloid. The figure shows clearly that the angle between the wing $a$ and the tangent $t$ is varied in value and may be positive or negative, according to the point of the cycloid which is considered.

The vertical speed of translation (Fig. 10) is given by the formula $V = \omega X$, wherein $\omega$ is the angular speed of rotation of the wheel. The horizontal speed of translation (Fig. 11) is given by the formula $V^1 = \omega y$, wherein $y$ is the ordinate of the intersecting point of the normals to the wings.

It is shown by theory as well as by experiments that the optimum efficiency obtained with my said wheel will be reached when the speed of translation is six-tenths the speed of rotation of the wheel. It is proved by calculation that an aircraft provided with my said propeller, travelling at 360 km. per hour, whose wings have 3 m. width and 0,85 m. length and are 5 in number, and wherein the maximum angle $\beta$ (Fig. 10) is 14°30, will carry a load 4000 kgs. This example corresponds to a lifting surface of 12.75 m². The necessary power for an angular speed of rotation $\omega = 50$ and a wheel diameter of 4 m. is 604 H. P. These calculations have nothing in common with the usual calculations for flight, which are the same as in the case of an ordinary aeroplane.

Obviously, my said invention is not limited to the aforesaid embodiments hereinbefore set forth, and the same is susceptible of numerous modifications without departing from the principle of the invention.

It is evident, for instance, that the number of wheels may differ from two, and the number of wings may be more or less than five; the wings may have any suitable shape. It is also evident that any suitable transmission means may be employed to vary the eccentricity of the polygonal cam, without leaving the aeroplane body.

Having now described my invention what I claim as new and desire to secure by Letters Patent is:

1. A turbine wheel for working in a fluid in relative motion thereto, comprising in combination a rotary member, a number of oscillating members pivoted to said rotary member about axes parallel to the axis of rotation of said rotary member, an eccentric member adapted to rotate about an axis parallel to said axis of rotation, rigid members extending in a substantially radial direction and respectively pivoted to said oscillating members and means for connecting said eccentric member to said rigid members whereby the latter may take slight displacements of translation in a direction substantially parallel to the corresponding tangent to said eccentric member during the operation of the wheel.

2. A turbine wheel for working in a fluid in relative motion thereto, comprising in combination a rotary member, a number of oscillating members pivoted to said rotary member about axes parallel to the axis of rotation of said rotary member, a corresponding number of straight guiding members adapted to rotate as a whole about an axis parallel to said axis of rotation and extending substantially tangentially with respect to their trajectory and rigid members respectively pivoted at one end to said oscillating members, the other end being adapted to slide without turning within the corresponding guiding member.

3. A turbine wheel for working in a fluid in relative motion thereto comprising in combination a rotary member, a number of oscillating members pivoted to said rotary member about axes parallel to the axis of rotation of said rotary member, a stationary eccentered member of adjustable position relatively to said axis of rotation, a number of straight guiding members equal to that of said oscillating members adapted to rotate as a whole about said eccentered member, and extending in a direction substantially parallel to their trajectory rigid members respectively pivoted at one end to said oscillating members, the other end being adapted to slide without turning within the corresponding guiding member, and means for adjusting said eccentered member in any direction transverse to said axis of rotation.

4. A turbine wheel for working in a fluid in relative motion thereto, comprising in combination a rotating shaft, a rotary member secured to said shaft, a plurality of oscillating members pivoted to said rotary member about axes parallel to said shaft, a rotary eccentric member provided with a plurality of slots in a number equal to that of said oscillating members, a corresponding number of links pivoted at one end to said oscillating members, and at least two rollers mounted at the opposite end of each link and cooperating with a corresponding slot.

5. A turbine wheel for working in a fluid in relative motion thereto, comprising in combination a rotating shaft, a rotary member secured to said shaft, a plurality of oscillating members pivoted to said rotary member about axes parallel to said shaft, a fixed eccentered member having a central aperture, said shaft extending therethrough, a rotating member rotatably mounted upon said eccentered member and provided with a plurality of slots in a number equal to that of said oscillating members, a corresponding number of links pivoted at one end to said oscillating members, two rollers mounted at the opposite end of each link and cooperating with a corresponding slot, and means for displacing said eccentered member in any direction transverse to said shaft.

6. A turbine wheel for working in a fluid in relative motion thereto, comprising in combination a rotating shaft, a rotary member secured to said shaft, a plurality of oscillating members, pivoted to said rotary member about axes parallel to said shaft, a stationary disc having a central aperture and two parallel slides, said shaft extending through said aperture, a circular plate rotatably mounted on said disc and provided with a plurality of slots in a number equal to that of said oscillating members, a corresponding number of links pivoted at one end to said oscillating members, two rollers mounted at the opposite end of each link and co-operating with a corresponding slot, a fixed plate provided with a plurality of parallel elongated openings at right angle to said slides, a frame of adjustable position provided with studs cooperating with said elongated openings, sliding members secured to said studs and engaging said slides, means for displacing said disc in a direction parallel to said slides and means for displacing said frame in a direction parallel to said elongated openings.

7. In a flying machine a supporting and propelling device constituted by one or more turbine wheels, each comprising a rotary member adapted to rotate about an axis of rotation at right angle to the longitudinal axis of said flying machine, a plurality of oscillating members pivoted to said rotary member and having their axes of oscillation parallel to said axis of rotation, a rotating eccentric member of adjustable eccentricity relatively to said axis of rotation, rigid members cooperating with said eccentric member and pivoted to said oscillating surfaces and means, controlled by the pilot, for adjusting the eccentricity of the eccentric member of each turbine wheel.

8. In a flying machine, a supporting and propelling device constituted by one or more turbine wheels, each comprising a rotary member having its axis of rotation at right angle to the longitudinal axis of said flying machine, a number of oscillating members pivoted to said rotary member and having their axes of oscillation parallel to said axis of rotation, a stationary eccentered member of adjustable position relatively to said axis of rotation, a number of straight guiding members equal to that of said oscillating members and adapted to rotate as a whole about said eccentered member, rigid members respectively pivoted at one end to said oscillating members, the other end being adapted to slide within the corresponding guiding member, a gear wheel operatively connected to said eccentered member and a worm meshing with said gear wheel and adapted to be actuated by the pilot for varying the eccentricity of said eccentered member.

9. In a flying machine a supporting and propelling device constituted by one or more turbine wheels, each comprising a central rotating shaft at right angle to the longitudinal axis of said flying machine, a rotary member secured to said shaft, a plurality of oscillating wings pivoted to said rotary member about axes parallel to said shaft, a stationary disc having a central aperture and two parallel slides, said shaft extending through said aperture, a circular plate rotatably mounted on said disc and provided with a plurality of slots in a number equal to that of said oscillating members, a corresponding number of links pivoted at one end to said oscillating wings, two rollers mounted at the opposite end of each link and co-operating with a corresponding slot, a fixed plate provided with a plurality of parallel elongated openings, at right angle to said slides, a frame of adjustable position provided with studs cooperating with said elongated openings, sliding members secured to said studs and engaging said slides, manually controlled means for displacing said disc in a direction parallel to said slides and manually controlled means for displacing said frame in a direction parallel to said elongated openings.

10. In a flying machine according to claim 7, the further feature residing in that said rotary member is constituted by a disc and a plurality of arms secured to said disc and having their front edge tangent to said disc, substantially as described.

11. In a flying machine a supporting and propelling device comprising in combination a common shaft at right angle to the longitudinal axis of said flying machine, four star shaped members secured to said shaft, each having the same number of arms, two sets of oscillating wings, each wing of one set being pivoted at its ends on the corresponding arms of the two left-hand star-shaped members respectively, and each wing of the other set being pivoted at its ends on the corresponding arms of the two right-hand star-shaped members respectively, the axes of oscillation of said wings being parallel to said common shaft, and, for each set of wings, a stationary eccentered disc having a central aperture and two parallel slides, said shaft extending through said apertures, rigid members cooperating with said disc and respectively pivoted to said oscillating wings, a fixed plate provided with a plurality of parallel elongated openings at right angle to said slides, a frame of adjustable position provided with studs cooperating with said elongated openings, sliding members secured to said studs and engaging said slides, a tubular spindle provided with a helically toothed quadrant, a lever connection between said tubular spindle and said disc, an inner spindle within said tubular spindle, a helically toothed quadrant secured to said inner spindle, a lever connection between said inner spindle and said frame, two vertical control shafts, and worms respectively secured at the upper end of said shafts, and cooperating with said quadrants respectively.

12. In a flying machine according to claim 11, the further feature residing in the provision of means, actuated by the pilot, for simultaneously rotating the vertical shafts corresponding to said inner spindles in both sets of wings, and adapted to allow a slight reverse rotation of said shafts relatively to one another, and means actuated by the pilot for simultaneously rotating the vertical shafts corresponding to said tubular spindles in both sets of wings, and adapted to allow a slight reverse rotation of said shafts relatively to one another.

In testimony whereof I have signed my name to this specification.

CARL BRUNO STRANDGREN.